(12) United States Patent
Alam et al.

(10) Patent No.: US 8,521,501 B2
(45) Date of Patent: Aug. 27, 2013

(54) REAL-TIME PERFORMANCE MODELING OF APPLICATION IN DISTRIBUTED ENVIRONMENT AND METHOD OF USE

(75) Inventors: Akm K. Alam, Erie, CO (US); Vyacheslav Barsuk, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 11/769,573

(22) Filed: Jun. 27, 2007

(65) Prior Publication Data
US 2009/0006069 A1 Jan. 1, 2009

(51) Int. Cl.
*G06F 9/45* (2006.01)
*G06F 9/44* (2006.01)

(52) U.S. Cl.
USPC .............................. 703/22; 717/121; 717/127

(58) Field of Classification Search
USPC ..................................... 703/22; 717/121, 127
See application file for complete search history.

(56) References Cited

U.S. PATENT DOCUMENTS

| | | | | |
|---|---|---|---|---|
| 6,847,970 B2 * | 1/2005 | Kar et al. | | 707/100 |
| 7,124,188 B2 * | 10/2006 | Mangipudi et al. | | 709/226 |
| 7,337,365 B2 * | 2/2008 | Zunino et al. | | 714/38.11 |
| 7,383,161 B2 * | 6/2008 | Dournov et al. | | 703/2 |
| 2002/0087734 A1 | 7/2002 | Marshall et al. | | |
| 2004/0034848 A1 | 2/2004 | Moore et al. | | |
| 2005/0114494 A1 * | 5/2005 | Beck et al. | | 709/224 |
| 2005/0172306 A1 | 8/2005 | Agarwal et al. | | |
| 2006/0041660 A1 * | 2/2006 | Bishop et al. | | 709/224 |
| 2006/0059253 A1 * | 3/2006 | Goodman et al. | | 709/223 |
| 2006/0101308 A1 | 5/2006 | Agarwal et al. | | |
| 2006/0150188 A1 * | 7/2006 | Roman et al. | | 718/104 |
| 2007/0083642 A1 * | 4/2007 | Diedrich et al. | | 709/224 |
| 2007/0198656 A1 * | 8/2007 | Mazzaferri et al. | | 709/218 |
| 2008/0120129 A1 * | 5/2008 | Seubert et al. | | 705/1 |
| 2008/0140636 A1 * | 6/2008 | Brodhun et al. | | 707/3 |
| 2008/0270077 A1 * | 10/2008 | Ozonat et al. | | 702/186 |

OTHER PUBLICATIONS

Arati Baliga, NPL Publication, "Network Monitoring and Forensics", Aug. 2, 2004.*
W. Cesaro, NPL Publication, "Object-based hardware/software component interconnection model for interface design in system-on-a-chip circuits", Elsevier 2003.*
A Brown, NPL, "An active approach to characterizing Dynamic Dependencies for Problem Determination in a Dsitributed Environment", Jun. 15, 2000.*
A. Brown et al., An Active Approach to Characterizing Dynamic Dependencies for Problem Determination in a Distributed Environment (Date Unknown) posted at http://roc.cs.berkeley.edu/edu/papers/im01.pdf.
A. Baliga et al., Network Monitoring and Forensics (Date Unknown) posted at http://vvww.research.rutgers.edu/~aratib/presentations/forensics_paper.pdf.

* cited by examiner

*Primary Examiner* — Omar Fernandez Rivas
*Assistant Examiner* — Angel Calle
(74) *Attorney, Agent, or Firm* — Yee & Associates, P.C.; Arthur J. Samodovitz

(57) ABSTRACT

A system and method of managing computing systems and, more particularly, to a system and method for modeling applications in a network. The method includes determining dependency of components in a shared distributed computing environment and measuring consumption of the dependent components. The method further includes building a model to compare component behavior with a current load of the dependent components to optimize component performance or to find a deviation and hence a "troubled spot". The system includes a local agent configured to perform the method and to provide data to a centralized storage.

23 Claims, 3 Drawing Sheets

REAL-TIME PERFORMANCE MODELING OF APPLICATION IN DISTRIBUTED ENVIRONMENT AND METHOD OF USE

FIELD OF THE INVENTION

The invention generally relates to a system and method of managing computing systems and, more particularly, to a system and method for modeling applications in a network.

BACKGROUND OF THE INVENTION

Distributed computing is a natural result of the use of networks to allow computers to efficiently communicate. More specifically, distributed computing is a method of computer processing in which different parts of a program run simultaneously on two or more computers that are communicating with each other over a network.

Various hardware and software architectures are used for distributed computing. That is, there are numerous technologies and standards used to construct distributed computing system, including some which are specially designed and optimized for that purpose, such as Remote Procedure Calls (RPC) or Remote Method Invocation (RMI) or .NET Remoting.

By more specific example, in distributing computing, at a lower level, multiple CPUs must be interconnected with a network. At a higher level, processes running on those CPUs with a communication system must be interconnected. For these reasons, distributed programming typically falls into one of several basic architectures or categories: Client-server, N-tier architecture, Distributed objects, loose coupling, or tight coupling.

As such, with many different types of distributed computing systems, there are many challenges to overcome in successfully designing such distributed computing systems. One challenge is to connect users and resources in a transparent, open, and scalable manner. However, if not designed properly, a distributed computing system can decrease the overall reliability of computations as the unavailability of a node can cause disruption of the other nodes. Troubleshooting and diagnosing problems, as well as analyzing performance in a distributed computing system, can also be difficult. A known methodology allows automatic performance data gathering per a particular server and allows future manual performance analysis of a particular server; however, there is no known way of providing integrated application performance behavior patterns.

Accordingly, there exists a need in the art to overcome the deficiencies and limitations described hereinabove.

SUMMARY OF THE INVENTION

In a first aspect of the invention, a method comprises determining dependency of components in a shared distributed computing environment and measuring consumption of the dependent components. The method further includes building a model to compare component behavior with a current load of the dependent components to optimize component performance.

In another aspect of the invention, a method for deploying an application for managing components in a distributed computing system is provided. The method comprises providing a computer infrastructure being operable to determine a relation between components in the distributed computing system; gather data of dependent components based on the determined relationship; provide the gathered data to a centralized storage; build a model of resource consumption for the dependent components using the gathered data; and compare the built model to a current load on the dependent components to determine optimal performance of the dependent components.

In another aspect of the invention, system comprises an agent locally on at least two computing systems in a distributed computing system. The agent has a computer program embodied in medium operable to determine a dependency of components in the distributed computing system, measure consumption of the dependent components in the distributed computing system, and build a model to compare against actual resource utilization of the dependent components in order to optimize component performance.

DETAILED DESCRIPTION OF EMBODIMENTS OF THE INVENTION

The invention generally relates to a system and method of managing computing systems and, more particularly, to a system and method for modeling applications in a network. More specifically, the system and method of the invention is configured to analyze real-time application performance behavior and perform problem determination in a shared distributed computing environment.

In embodiments, the system and method is configured to determine a dependency of components in a shared distributed computing environment, measure consumption of the components and build a mathematical model to determine component behavior. The performance modeled data are gathered on a regular basis from each participating server, grouped by application components and stored in a central database. Further analysis of the data from the central database allows an agent (user) to check whether the application components' behavior is matching a pattern, whether that pattern be a "normal" pattern, a predetermined pattern, etc.

System Environment

As discussed in more detail below, the system and methodology of the invention provides a way to simulate application load in a shared environment and assist in the selection of proper computing systems (servers) to locate application components in order to better utilize existing resources in the environment. The performance of each application component is a function of performance of dependent components and resources of the server where the component is running.

Dependent components can be applications, in a general case. Also, in embodiments, an application can be represented by a set of different processes running on a single server or separate servers (virtual nodes in a client /server environment). These processes are interdependent in that they communicate with each other according to the business rules of the application. These communications generate certain loads on the process, e.g., consumes system resources like CPU, memory, i/o utilization, such that an increase of load on input components will be reflected by a changed load on dependent components.

Figure 1:
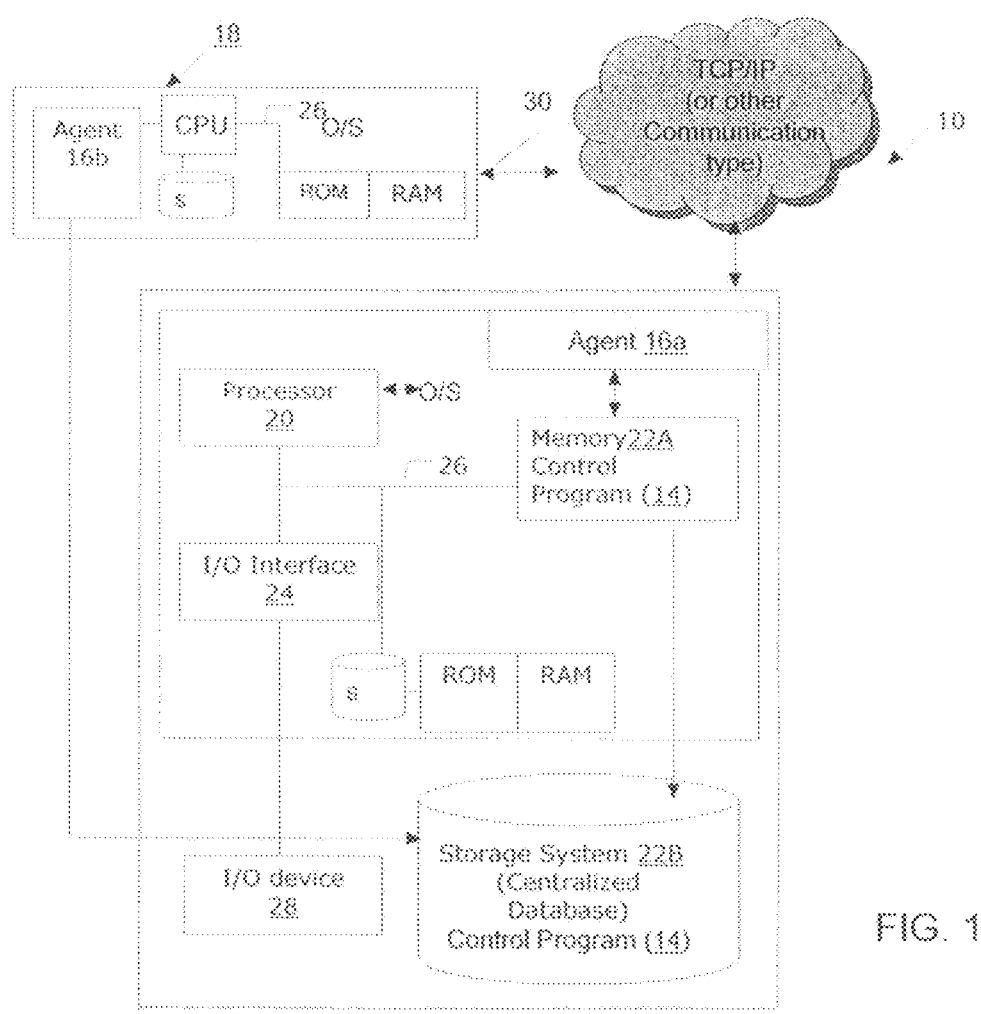
FIG. 1 shows an illustrative environment in accordance with the invention.

FIG. 1 shows an illustrative environment 10 for managing the processes in accordance with the invention. The illustrative environment may be one or more machines representative of servers, computing devices, etc. (Hereinafter, computing device(s) will be used to generally describe any number or type of computing machine(s), except in certain examples, for clarity, where server and client are used to describe the computing machines.) In implementation, computing device 10 communicates with one or more other computing devices 18 over TCP/IP or other communication protocols discussed herein. It should be recognized by those of ordinary skill in the art that the present invention may equally be implemented using one computing device or multiple computing devices, depending on the interdependency of components performing an application or process.

In implementations using multiple computing devices, the computing devices can include the same or different components thereon, e.g., CPU, RAM, ROM, storage, etc., communicating via a communications link or bus 26, discussed in greater detail below. The computing device 10 and computing device 18 may also include an agent 16a, 16b, respectively, having the functionality and capabilities as described herein. (Agent 16a and 16b will be referred to generally as reference numeral 16, hereinafter.) In embodiments, the agents are running on multiple computers asynchronously from each other. The computing devices can use the same or different communication protocols such as, for example, UNIX sockets or OS queuing mechanism within the same computing device instance, and/or TCP/IP protocol to communicate between processes on the same or different computing devices.

Referring still to FIG. 1, the computing devices include agent 16, which is configured to monitor system components and resource consumption of the components on each computing device. Performance data can be gathered for identified processes, e.g., CPU and memory utilization, i/o, etc., over time. In embodiments, agent 16 also, over time, determines the interaction and, hence, dependency of different components in the environment, for each of the computing devices, etc. and for each application.

The agent 16 provides the performance data and dependencies of the different components of the computing devices to a centralized database 22b, for future retrieval and analysis. Thus, by implementing the system and method of the present invention, automatic dependence identification of application components (processes) and modeling of their load characteristics can be made to compare current load with a modeled load (regular load under similar circumstances). This provides the opportunity to identify whether behavior of the application components is between acceptable ranges and to locate any non-properly functioning component.

A control program 14 for the agent 16 (and for performing the processes described herein) may be stored temporarily or permanently in a memory 22A or storage system 22B. As should be understood by those of skill in the art, the control program may provide the functionality of the agent 16, as well as any computing necessary for automatic dependence identification of application components (processes), modeling of their load characteristics, identification as to whether behavior of the application components is between acceptable ranges and to locate any non-properly functioning component, amongst other features.

The memory 22A can include local memory employed during actual execution of program code, bulk storage, and cache memories which provide temporary storage of at least some program code in order to reduce the number of times code must be retrieved from bulk storage during execution. The computing device 10 further includes a processor 20, an input/output (I/O) interface 24, a bus 26, Storage "S", ROM, RAM and an external I/O device/resource 28. The external I/O device/resource 28 may be a keyboard, display, pointing device, or any device that enables the control program to communicate with one or more other computing devices using any type of communications link 30. The communications link 30 can be, for example, wired and/or wireless links; one or more types of networks (e.g., the Internet, a wide area network, a local area network, a virtual private network, etc.); and/or any known transmission techniques and protocols such as, for example, TCP/IP.

The processor 20 executes the computer program code and logic of the agent 16, which is stored in the memory 22A and/or storage system 22B. While executing the computer program code, etc., the processor 20 can read and/or write data to/from the memory 22A, storage system 22B, and/or I/O interface 24. The bus 26 provides a communications link between each of the components in the computing device.

It should be understood that the invention is considered to comprise components which can run independently/dependently on one or more computers. Those application components interact with each other according to application business rules as discussed hereon. The interaction could be via network (TCP/IP protocol, for example) or locally within the same computer (again TCP/IP or UNIX socket or shared memory, for example). The application components relations are identified in multiple ways and accumulative resource consumption by those components over time intervals. It is not necessarily that application components are working simultaneously. Also, the present invention is more encompassing than the use of only distributed computing; although distributing networks are contemplated by the invention. In one example, one component can trigger activity of other component, much like one application might activate another application.

EXAMPLE OF OPERATION

In embodiments, the process of the invention includes two parts: (i) identify application process with respect to other application components and (ii) dependence performance analysis. Also, as discussed herein, different mathematical modeling technologies can be used to build dependence curves of performance components for related processes. Further, mathematical analysis can be used to find a performance pattern under certain constraints. These constraints may be, for example, performance capacities of participating computing devices. Performance of particular computing devices can be considered as a sum-up performance of separate processes running on the computing device. Some of the processes are system related processes; whereas, other of the processes are application related processes.

An application can be considered as a set of components running on multiple computers connected into the network. Multiple components of the application can reside on the same physical machine (e.g., computing device) or on different machines. As should be understood by those of skill in the art, in a shared environment, a single machine can host components of multiple applications. And, in order for an application to function, the application components need to communicate with each other. The application components can use one of the standard communication protocols supported by operating system, e.g., TCP/IP, sna, UNIX sockets. As is known, UNIX sockets are use for communication within the same computer.

By way of example, an end user uses a client (web browser) to access an application on a webserver. The webserver, in turn, needs to access multiple database servers. The same database servers might serve other clients. Accordingly, in such environment, it is important to analyze real-time application performance behavior and perform problem determination in a shared distributed computing environment in order to optimize system performance.

As each application component is a program running on particular computer, there is resource consumption associated with each of those processes. Resources can be, but not limited to, CPU utilization and memory utilization. As should be understood, the resource utilization by process is changed over time and depends on process activity. For example, when one process (client process) starts to communicate to another (server process), CPU utilization by the server process will increase. (The server process might be idling, e.g., not consuming CPU resource while there is no client activity.) Under exactly the same conditions, the same load (the same request) from the client can generate the same resource consumption response from the server process. In this way, in embodiments, all application components can be in multistage client/server relations to each other, i.e., the client initiates a request and the server responds to the request.

In operation, by analyzing the communication layer on a regular basis from the operating system standpoint, it is possible to establish, over a period of time, how the application components communicate with each other and with what other components they communicate. In this way it is possible to build an application component map, automatically.

With this understanding, the system and method of the present invention determines resource consumption response using the below illustrative equation, $$Rs=Fs(Rc,A). \tag{1}$$

In equation (1), Rs represents server resource consumption response, Rc represents client resource consumption response, and A represents constant parameters dependent on application and computer configuration (e.g., types and quantity of CPUS and the like). It should be understood that Rs and Rc can represent resources on any number of different computing machines and that the use of the server/client is merely one illustrative example implementing the processes according to the invention. The resource consumption response might be computing time used by the process in milliseconds, as one example.

Additionally, client resource consumption response may be represented by the following equation, $$Rc=Fc(Rs, B). \tag{2}$$

Fc and Fs are different functions and A and B are different sets of parameters for expression of client vs. server and server vs. client load.

With this example, Fs can be selected as a class of functions, for example, $$Fs(X,A)=X*X*A+X*A_2+A_3. \tag{3}$$

In the above example, A is a set of three parameters; although, it should be understood that more or less than three parameters can be used in accordance with the invention. Now, knowing the parameters and client CPU consumption, it is possible to calculate Fs using equation (3) and server resource consumption using equation (1).

After gathering performance data on a regular basis, it is possible to obtain multiple data samples for different resource consumption responses of both the server and client process. For example, $$Rs1=Fs(Rc1,A), Rs2=Fs(Rc2,A), \ldots RsN=Fs(RcN,A), \tag{4}$$

where N represents quantity of samples, e.g., 100, 1000, 2000, 10000 or other quantity. In each case, parameter A and function Fs remain the same. Equation (4) can be minimized as follows, $$|Rsi-Fs(Rci,A)| \tag{5}$$

where i=1 ... N (i goes through entire range from 1 to N, checking all samples.) In this example, all groups are checked for each i value to find a largest expression of i. Additionally, it is required to find the value of A which will deliver the smallest expression value.

Now, by implementing the invention, it is possible to identify parameters A based on the results of observations. By way of example, multiple optimization methods can be used to obtain the numerical value of A, such as gradient methods. Optimization methods are well known in the art to those of skill and, as such, further explanation is not required herein. As should be understood, by knowing the input, it is now possible to calculate and predict output of the processes.

The function Fs with identified parameters A represent a model of the relation between application components. However, normally, each server process can respond to multiple client processes. As such, Fs, in such cases, is a function of multiple client inputs and therefore it is possible to obtain a much larger system of equations. Furthermore, each computing system has certain limitations such as, for example, if multiple server processes are running on the same computer, they will be consuming resources concurrently and affect each other thereby slowing response time to the client.

Processes in Accordance with the Invention

Figure 2A:
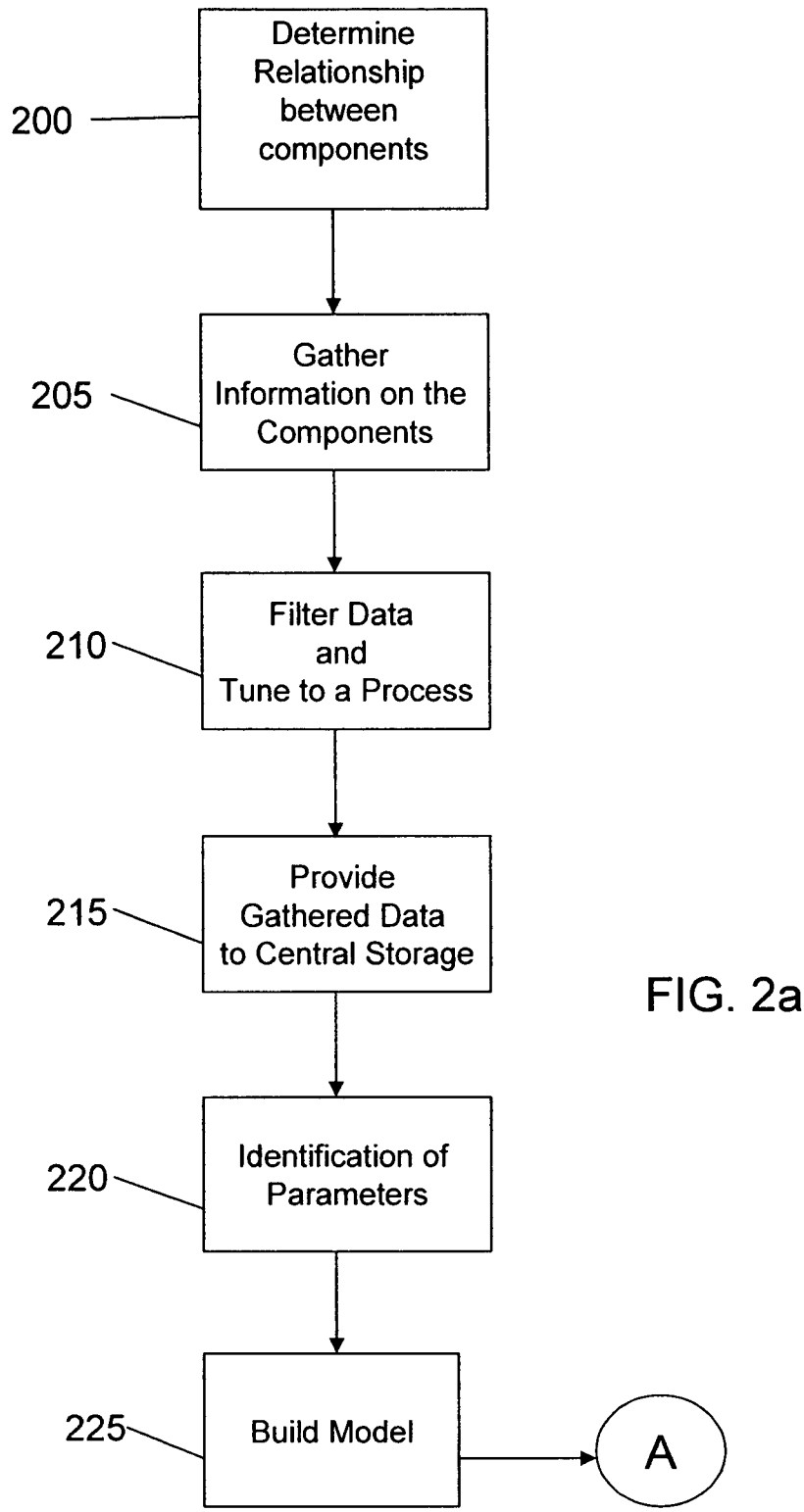
FIGS. 2a-2b are flow charts of processing steps implementing aspects of the invention.
Figure 2B:
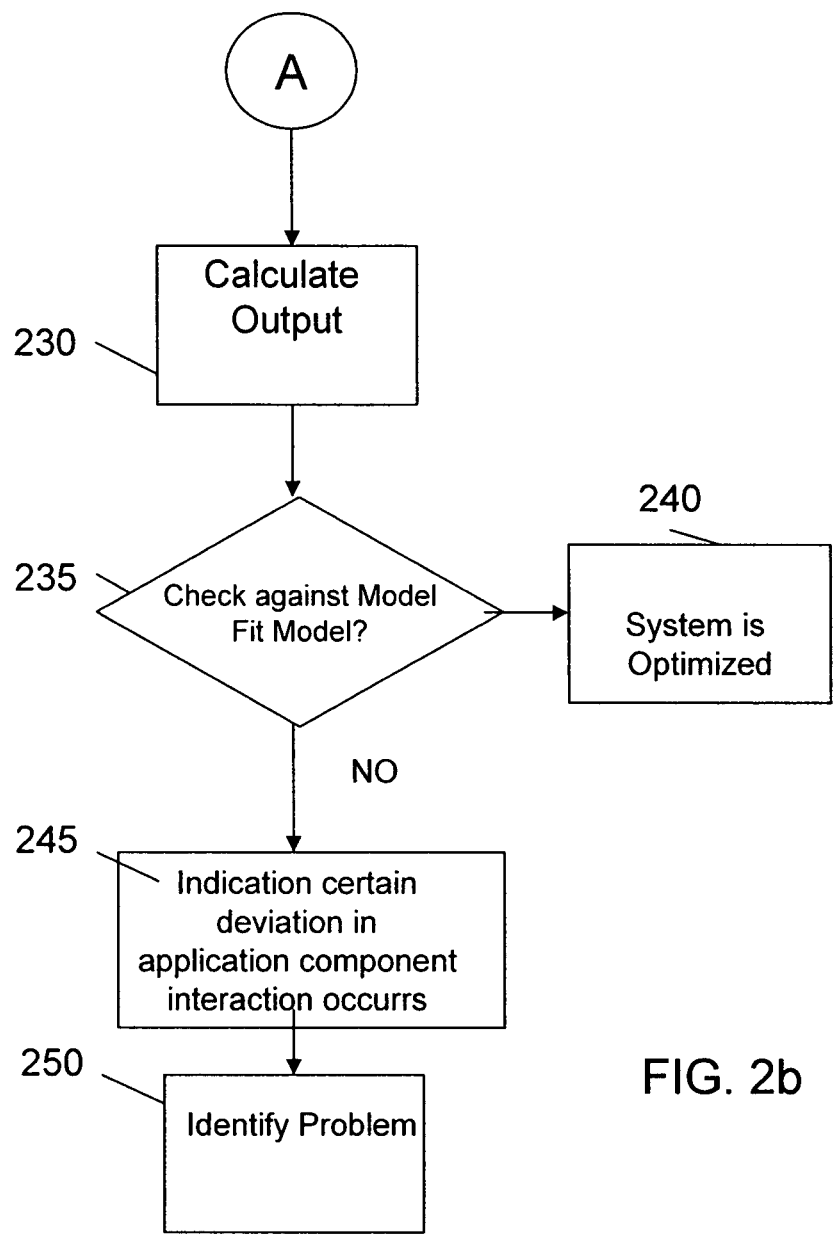

FIGS. 2a and 2b are flow diagrams implementing steps of the invention which may be implemented in the environment of FIG. 1. FIGS. 2a and 2b may equally represent a high-level block diagram of the invention. The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable storage device can be any apparatus that can store, the program for use by or in connection with the instruction execution system, apparatus, or device. The storage device can be an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk -read only memory (CD-ROM), compact disk-read/write (CD-R/W) and DVD. The terms "computer readable storage device" and "computer readable storage medium" do not include signal propagation media.

In embodiments, the invention provides a method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers.

In return, the service provider can receive payment from the customer(s) under a subscription and/or fee agreement and/or the service provider can receive payment from the sale of advertising content to one or more third parties.

Referring to FIGS. 2a and 2b, at step 200, the control program determines a relation between components. This allows the processes to group the relations by client server pairs. For example, in case of TCP/IP, the server process will listen on a predefined TCP port (generally speaking different for different components or applications), and the client, when active, will establish a connection with the server. The connectivity link and information thereof can be obtained by the agent using the netstat command output. In this case, the netstat command output shows ip addresses and ports for both the client and server.

At step 205, the agent (control program) begins to gather data of the components on each computer in the distributed computing environment. At step 210, the agent can filter link/process data and tune to particular processes. In embodiments, the data gathering is performed in synchronized manner. At step 215, the agent(s) provides the data to centralized storage. Communication with the centralized storage can be used as a time synchronization point, where the agent(s) "talks" to the centralized storage on regular basis, e.g., once in 5 or 10 minutes. While the agents communicate with the centralized storage, they are able to obtain a precise clock difference with respect to the centralized storage, thus giving way to "synchronize" data collection.

In embodiments, the agents are running on multiple computers asynchronously from each other, i.e., they have their own schedule. Also, the agents are looking for accumulated resource consumptions during normalized intervals, not instant resource consumptions. For example, CPU utilization is obtained between moments t1 and t2. (Since each computer has its own values of t1 and t2, collected data should be normalized when processes are put in the centralized storage.)

At step 220, the program performs identification of parameters of function F using the normalized data. At step 225, the program builds the computational model, as discussed above. The computational model will depend on the relation data provided from step 200, as well as gathered data of the dependent components for applications or processes. As should be understood, different standard mathematical methods of optimization can be used for this purpose as should be understood and capable of implementation by those of skill in the art without any undue experimentation.

At step 230, since the parameters are identified, the program calculates output based on the known input, e.g., server resource consumption given client resource consumption. In a dynamic environment when relations between application components are changed, e.g., component moved to another computer or new application component is added or component is added/configuration change of one of computers, recalculation of the parameters is contemplated using the methodology discussed herein.

As now should be understood in view of the above disclosure, when component resource consumption response is gathered on a regular routing basis by the agent, the data can be checked against the built model, at step 235. If the data does fit the model, the system is optimized (step 240). If the data does not fit the model, the program makes an indication that a certain deviation in application component interaction has occurred, at step 245. At step 250, the program can use this information to point to a problem and determine which application component is using resources differently. In this way, it is possible to optimize the system. Thus, depending on computer parameters, e.g., quantity and speed of CPU, identification of the values of the parameters would be different, and issues such as how to add/remove computer resources or move application components to different computers can be modeled and optimized.

It should be recognized that process ID changes over time, but the application component must follow the same application business rules, e.g., front end java processes talk to the same database (the same server and TCP port). Identification of certain process ID is performed by matching a process that uses the same communication patterns to other processes.

While the invention has been described in terms of embodiments, those skilled in the art will recognize that the invention can be practiced with modifications and in the spirit and scope of the appended claims.

What is claimed is:

1. A method for modeling an application, comprising:
an agent program, executing on a computing device, determining interdependency of software components performing the application in a distributed computing environment, the agent program determining the interdependencies of the software components based on interactions of the software components with each other, the interactions including sets of parameters passed as input to the software components, respectively, the sets of parameters passed as input to the software components causing the interactions between the software components based on processing of the sets of parameters by the software components;
the agent program obtaining performance data for the software components that measures resource consumption of the software components for each of the sets of parameters passed as input to each of the software components as the software components process the sets of parameters in the distributed computing environment;
the agent program building a model of the resource consumption for the software components for each of the sets of parameters passed as input to each of the software components in the distributed computing environment, wherein the model compares the resource consumption of the software components for each of the sets of parameters; and
the agent program determining and recording a change in the interdependencies between the software components that occurred from interactions of the software components performing the application monitored by the agent program after building the model.

2. The method of claim 1, wherein the obtaining step is performed on a predetermined time basis for each participating software component in the distributed computing environment.

3. The method of claim 1, wherein the performance data is stored in a central database.

4. The method of claim 3, wherein the performance data is stored in the central database in a synchronized manner.

5. The method of claim 4 further comprising:
obtaining from a central storage a time synchronization point for storing the performance data.

6. The method of claim 1, wherein the resource consumption comprises consumption of CPU and memory.

7. The method of claim 1, further comprising:
comparing a current resource consumption of the software components to the model to at least one of determine whether the current resource consumption is within acceptable limits and locate any non-properly functioning software components in the distributed computing environment.

8. The method of claim 1, wherein the step of obtaining the performance data is performed by a plurality of agent programs, including the agent program, executing on respective computing devices, wherein the plurality of agent programs execute asynchronously relative to each other.

9. The method of claim 1 further comprising:
the agent program, executing on the computing device, monitoring for the performance data for the software components that measures the resource consumption after building the model;
the agent program, executing on the computing device, comparing the performance data with the model; and
the agent program, executing on the computing device, determining whether a change in the interactions between the software components has occurred from comparing the performance data with the model.

10. The method of claim 1, wherein the interactions of the software components performing the application in the distributed computing environment comprises using a network protocol to pass the sets of parameters as input to the software components.

11. The method of claim 1, wherein the interactions of the software components performing the application in the distributed computing environment comprises using shared memory to pass the sets of parameters as input to the software components.

12. The method of claim 1, wherein the step of the agent program determining the interdependencies of the software components based on interactions of the software components with each other comprises monitoring communications between the software components.

13. The method of claim 1, wherein at least one of the sets of parameters passed as input to the software components comprises one or more parameters passed to a software component.

14. A computer program product for modeling an application, said computer program product comprising:
a computer readable storage device and program code stored on the computer-readable storage device, the program code comprising:
program code for determining a resource consumption of a server by $$Rs = Fs(Rc, A) \quad (1)$$

wherein Rs represents the resource consumption of the server, Rc represents a resource consumption of a client, and A represents a set of constant parameters dependent on application and computer configuration;
program code for determining the resource consumption of the client by $$Rc = Fc(Rs, B) \quad (2)$$

where Fc is a different function than Fs, and B is a set of parameters different than the set of constant parameters for A;
program code for calculating Fs as a class of functions; and
program code for calculating multiple data samples for the resource consumption of the server and the resource consumption of the client by $$Rs_1 = Fs(Rc_1, A), Rs_2 = Fs(Rc_2, A), \ldots Rs_n = Fs(Rc_n, A) \quad (3)$$

where n represents a quantity of the multiple data samples and equation (3) can be minimized to $$|Rs_i - Fs(Rc_i, A)| \quad (4)$$

where i=1 . . . n , wherein the fourth program instructions iterates through an entire range of i from 1 to n, checking all samples for each i value, and the fourth program instructions find an expression which is largest and find value A which delivers a smallest expression value.

15. A computer program product for modeling an application, comprising:
a computer readable storage device, and program code stored on the computer-readable storage device, the program code comprising:
program code for determining interdependencies of software components performing the application in a distributed computing system based on interactions of the software components with each other, the interactions including sets of parameters passed as input to the software components, respectively, the sets of parameters passed as input to the software components causing the interactions between the software components based on processing of the sets of parameters by the software components;
program code for obtaining performance data for the software components that measures resource consumption of the software components for each of the sets of parameters passed as input to each of the software components as the software components process the sets of parameters in the distributed computing system based on a determined relationship between the software components;
program code for sending the performance data to a central database;
program code for building a model of the resource consumption for the software components for each of the sets of parameters passed as input to each of the software components in the distributed computing environment using the performance data in the central database, wherein the model compares the resource consumption of the software components for each of the sets of parameters;
program code for comparing the model to a current resource consumption of the software components to determine an optimal performance of the software components; and
program code for determining and recording a change in the interdependencies between the software components that occurred from interactions of the software components performing the application monitored after building the model.

16. The computer program product of claim 15, wherein the software components are paired by client server relations.

17. The computer program product of claim 15, wherein a computer infrastructure is operable to determine the determined relationship between the software components in the distributed computing system by a connectivity link between the software components.

18. The computer program product of claim 17, wherein the program code for determining interdependencies of software components performing the application in the distributed computing system based on interactions of the software components with each other, additionally includes program code for filtering link/process data and tuning to particular processes of the software components.

19. The computer program product of claim 15, wherein obtaining the performance data is performed in a synchronized manner.

20. The computer program product of claim 15, wherein the performance data is stored in the central database in a synchronized manner using a central storage as a time synchronization point.

21. The computer program product of claim 15, wherein obtaining the performance data is performed at a normalized interval.

22. A computer system for modeling an application, the computer system comprising:
a computer readable storage device, a computer readable memory, and one or more processors;
first program instructions to determine interdependencies of software components performing the application in a distributed computing system based on interactions of the software components with each other, the interactions including sets of parameters passed as input to the software components, respectively, the sets of parameters passed as input to the software components causing the interactions between the software components based on processing of the sets of parameters by the software components;
second program instructions to measure resource consumption of the software components for each of the sets of parameters passed as input to each of the software components as the software components process the sets of parameters in the distributed computing system;
third program instructions to build a model of the resource consumption for the software components for each of the sets of parameters passed as input to each of the software components in the distributed computing environment, wherein the model compares the resource consumption of the software components for each of the sets of parameters; and
fourth program instructions to determine and record a change in the interdependencies between the software components that occurred from interactions of the software components performing the application monitored after building the model,
wherein the first, second, third, fourth, and fifth program instructions are stored in the computer readable storage device for execution by at least of the one or more processors via the computer readable memory.

23. The computer system of claim 22, further comprising:
a central database for storing obtained data related to the consumption of the software components.

* * * * *